Sept. 7, 1948.　　　　W. J. AITKEN　　　　2,448,650
ELECTRIC CONTROL SWITCH
Filed March 22, 1944　　　　2 Sheets—Sheet 1
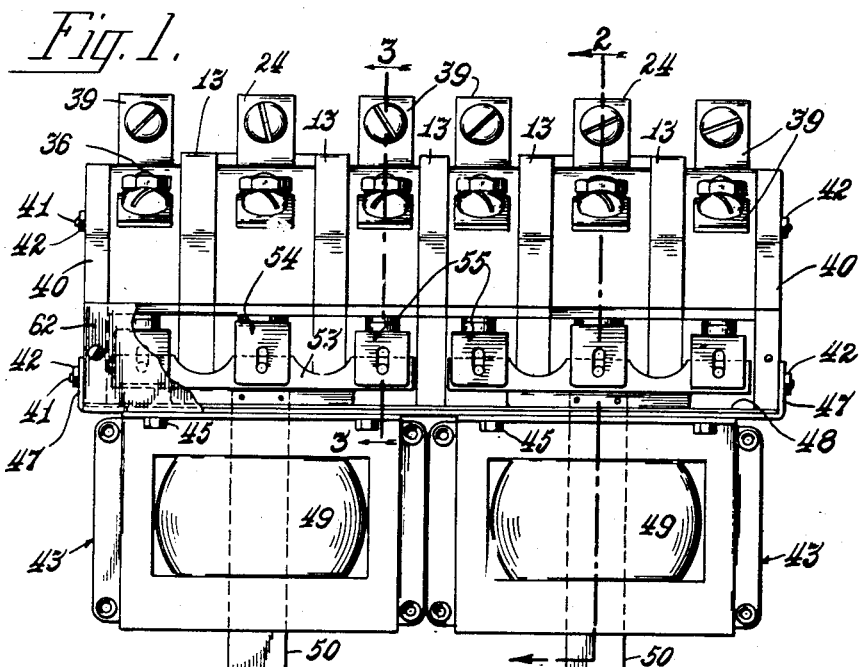
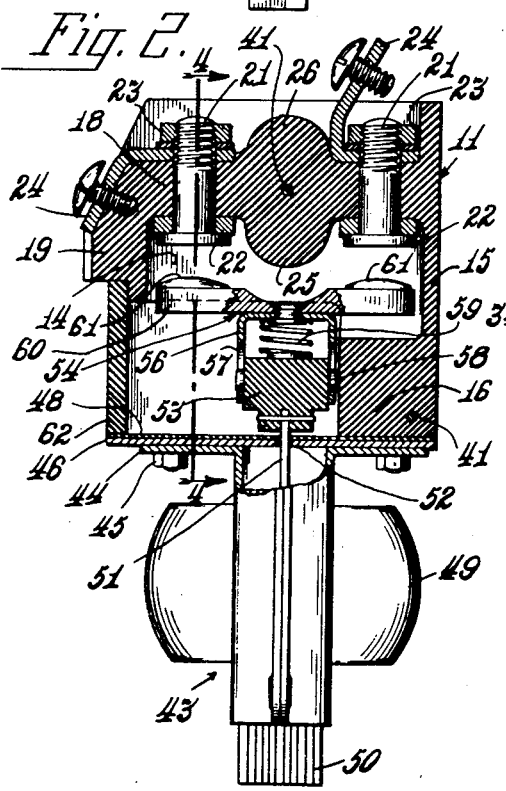
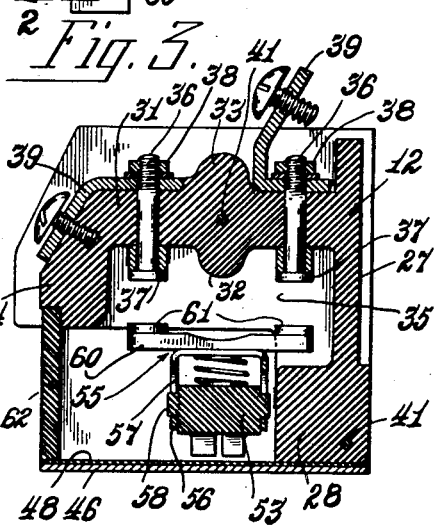
INVENTOR
WILLIAM J. AITKEN
by Frank J. Schrader Jr
ATTORNEY Sept. 7, 1948.  W. J. AITKEN  2,448,650
ELECTRIC CONTROL SWITCH
Filed March 22, 1944  2 Sheets-Sheet 2
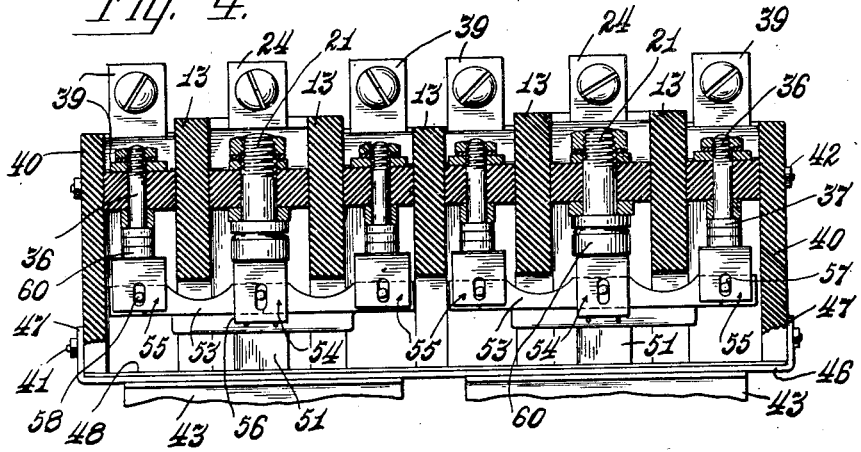
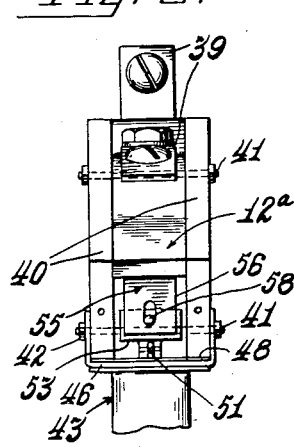
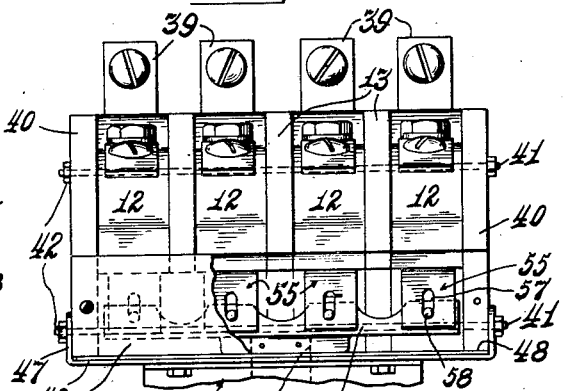
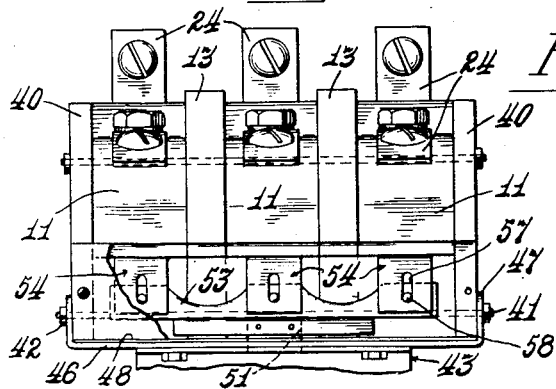
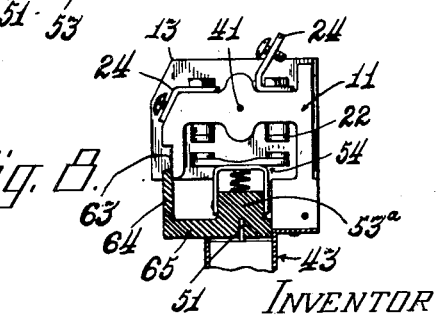
INVENTOR
WILLIAM J AITKEN
by Frank J Schraeder
ATTORNEY Patented Sept. 7, 1948

2,448,650

UNITED STATES PATENT OFFICE 2,448,650

ELECTRIC CONTROL SWITCH

William J. Aitken, Manitowoc, Wis.

Application March 22, 1944, Serial No. 527,580

1 Claim. (Cl. 200—104)

This invention relates to improvements in electrical control switches and is more particularly concerned with the structural characteristics and operation of a built-up or sectional switch of a kind wherein the number of independent electric circuits controlled thereby may be increased or decreased easily and in which the terminal contacts therein contained are adequately housed to prevent flash-overs, electric creepage and grounding.

A switch of the character exemplified in the accompanying drawing and to which this invention pertains, is particularly intended for use in a motor generator control panel although it will become apparent as the description proceeds that it is equally useful in association with other and varied electrical systems.

The switch of the present invention is somewhat similar in purpose to the built-up in-line electrical control switch disclosed and claimed in my co-pending application, Ser. No. 522,652, filed February 16, 1944, now abandoned, but in the instant disclosure the construction of the component parts is such that a multiple of sections, each complete in itself and containing switch elements, may be arranged side by side in a horizontal plane as distinguished from the vertical in-line or "stacked" arrangement of the earlier device. Other known types of switches of a kind frequently used in conjunction with motor generator control systems are expensive and difficult to manufacture and install primarily because their construction does not lend itself readily to enable one to easily and quickly increase or decrease the number of independent circuits controlled thereby, thus making it mandatory, in the event an increased number of circuits is called for in an existing installation or, where circuits of different or higher capacities are required, to add separate wholly independent switches at a greatly increased cost. Thus it will be understood that any increase in the number of circuits to be controlled in a motor generator panel installation or the like, involves the costly practice of adding a complete switch unit for each circuit added. It is therefore, an object of the present invention to provide a built-up switch structure of a kind embodying such novel features of construction as to enable the circuit capacity of the switch to be increased or decreased easily and inexpensively after it has been placed in service thus making it possible to increase the functions of the machine which it controls.

A switch structure of the kind herein exemplified is desirably made compact so as to thereby occupy a minimum amount of space when installed. Obviously such a switch having a multiple of contacts and switch elements each controlling independent electrical circuits must involve a structure capable of preventing flash-overs, electric creepage, sparking from pole to pole and grounding, hence it is another object of the invention to provide a combination of parts constructed to be assembled one with the other in such manner as to occupy but a minimum amount of space and further, one which is fashioned in a manner to prevent objectionable flash-overs, electrical creepage and grounding between the closely spaced but independent terminal contacts or poles contained therein.

In order to provide a switch structure of a kind that lends itself readily to easily accomplished variations in its circuit capacity, it is necessary to provide a structure having few stock parts which can be combined one with the other easily and quickly to make a complete unit and it is therefore, another object of the invention to provide a sectional switch structure comprising but few parts each of which may be combined with other of said parts in a manner to provide a single or a combination multiple switch unit and which affords independent arc hoods or chambers for each set of terminal contacts contained therein.

Certain known types of switches also usually are of a type wherein the switch contacts are moved into make or break position by a rotary action or through the actuation of toggle mechanisms. Such devices are objectionable in that the former frequently are subject to contact rebound with resultant danger of contact burning and possible welding, while the latter involve costly mechanisms, are noisy in operation and are subject to binding and resultant arcing. It is therefore, a further object of the present invention to provide a switch of a kind having a multiple of circuit closing terminals and which operates on a vertical line without danger of binding to effect rapid make or break contact so as to cause instantaneous rupture of the arc.

Other and further objects of the present invention will be apparent from the following description and claims and are illustrated in the accompanying drawings which, by way of illustration, show a preferred embodiment and the principle thereof and which is now considered to be the best mode for applying that principle. Other embodiments of the invention embodying the same or equivalent principle may be used and structural changes may be made as desired by those skilled in the art without departing from the present invention and the purview of the appended claim.

In the drawings:

Fig. 1 is a front elevational view of a sectional control switch assembly embodying features of the present invention.

Fig. 2 is a vertical transverse sectional view through one of the arc chambers, taken substantially on line 2—2 of Fig. 1.

Fig. 3 is a vertical transverse sectional view through another of the arc chambers, taken substantially on line 3—3 of Fig. 1.

Fig. 4 is a longitudinal sectional view of the sectional control switch, taken substantially on line 4—4 of Fig. 2.

Fig. 5 is a front elevational view of a control switch assembly embodying but one switch element.

Fig. 6 is a front elevational view, similar to Fig. 1, showing a control switch assembly consisting entirely of like medium capacity arc chambers.

Fig. 7 is a front elevational view of another control switch assembly consisting of a plurality of identical heavy capacity arc chambers.

Fig. 8 is a transverse sectional view through a modified form of switch assembly.

The switch of the present invention consists generally of an electromagnet having its armature operatively connected to one or more contact elements of a switch for causing said elements to have make and break contact with terminal contacts enclosed within one or more arc chambers and each connected to independent electric circuits. One such arc chamber is formed within the body of a substantially flat block of material non-conductive of electricity, and the switch of the present invention may consist of one or more of these blocks so as to provide any required number of arc chambers for the terminal contacts of each external circuit. Further, the invention contemplates the use of substantially identical blocks, varying only in size to accommodate the switch elements for circuits of different capacities, which may be joined together to provide a unitary sectional switch assembly limited only by the power of the operating electromagnet to provide the required contact pressure.

The exemplary solenoid switch assembly illustrated in Figs. 1 to 4 inclusive, of the accompanying drawing, is of a type intended to accommodate a plurality of independent circuits having different circuit capacities. As shown, the switch assembly includes a plurality of substantially identical arc chamber blocks 11 and 12 of electrically non-conductive material, suitably spaced apart and insulated one from the other by partition walls or electrical barriers 13. The blocks 11, best shown in Fig. 2, are intended to house switch elements having a relatively high electrical capacity as compared to the capacity of the switch elements contained within the blocks 12.

Referring now to the disclosure of Fig. 2, the blocks 11 are moulded or otherwise formed from suitable material non-conductive of electricity and resistant to flame of electric arc such as plastics, phenolic, porcelain, glass, hard rubber, or like material, and each is relatively thick and is provided with an interior opening extending upward from the lower edge thereof from face to face of the block and communicating with at least one edge so as to provide an arc hood partially surrounding an arc chamber 14. The lower extremity of the rear wall 15 of the arc hood is substantially thickened on its inside face, as at 16, and the overhanging top wall 18 which extends forwardly from the back wall 15, terminates at its front end in a downwardly extending front wall 19. The top wall 18 has a pair of vertical openings spaced apart from front to rear, each adapted to receive a stem 21, preferably formed integral with a terminal contact 22. The stems 21 are inserted into the openings in the top wall 18 so as to dispose the terminal contacts 22 within the arc chamber 14, as shown, and their upwardly projecting ends may be suitably threaded to receive securing nuts 23. An external circuit terminal connector 24 is fitted onto the projecting end of each stem 21 prior to securing the nuts 23 thereon so as to thereby provide means on the outside of the arc chamber whereby the terminal contacts 22 may be connected with an electrical circuit.

The bottom or inside face of top wall 18 of the arc chamber is provided, midway between the terminal contacts 22, with a barrier enlargement, preferably in the form of a rib 25 or like protuberance which depends downwardly into the arc chamber a suitable distance so as to prevent flash-overs, electrical creepage or sparking between the terminal contacts 22. A similar barrier protuberance 26, also in the form of a rib, is provided on the outside face of the top wall 18, midway between the external connectors 24, so as to prevent flash-overs, electrical creepage and sparking between the said connectors.

The arc chamber blocks 12, one of which is best shown in Fig. 3, are also constructed of material non-conductive of electricity and resistant to flame, and they are shaped substantially like blocks 11 but are smaller in general overall dimensions. More specifically, the block 12 includes a back wall 27 having an internal enlargement 28 at its lower end. A forwardly extending top wall 31 has medial barrier enlargements 32 and 33 and a downwardly turned wall 34 on its forward end so as to thereby define an arc hood partially surrounding an arc chamber 35. The top wall 31 is apertured to receive stems 36 spaced apart from front to rear, and the stems each have a terminal contact 37 on their lower ends disposed within the arc chamber 35. The stems 36 are threaded at their upwardly extending ends to receive nuts 38 for securing the terminal contacts in place after external circuit connectors 39 have been fitted thereover.

It should be obvious from the description hereinabove that the arc chamber blocks 11 and 12 differ only in their capacity and overall general dimensions and that they are sufficiently alike to permit their being combined one with the other so as to provide a unitary switch housing having a plurality of electrically insulated arc chambers, each including two terminal contacts suitably insulated one from the other so as to avoid flash-overs, electrical creepage or sparking between any of said terminal connectors at any time an electrical circuit is completed therethrough in a manner to be described presently.

The assembly of a plurality of arc chamber blocks 11 and 12 such as is illustrated in Figs. 1 and 4, preferably is accomplished by arranging the blocks in groups of from two or more each. End closure plates 40 of electrically non-conductive flame resistant material are laid against the outwardly disposed faces of the end arc chamber blocks at each end of the assembly to provide insulating end walls. The assembly, including the partitions or barriers 13, is suitably secured together firmly by means of tie-rods 41 extended therethrough and having nuts 42 on their ends. It should be noted at this time that a lower corner portion of each of the barriers 13 is cut out, as at 13a, and that the horizontal edges of the cut out portions 13a are in substantial alignment horizontally with the lower edges of the front walls 19 and 34 so that the lower portions of the arc chambers in each group are in communication one with the other to provide space for the bar 53 and for inspection of contact surfaces.

Each group of arc chamber blocks in the switch assembly illustrated in Fig. 1, is preferably provided with a switch mechanism having common means for making and breaking independent circuits in which their terminal contacts are arranged. Such switch mechanism includes any suitable operator, such as, for example, the electromagnetic operator 43 effective to actuate the common means controlling said circuits. The operator 43, preferably is of a kind having the magnetic field structure provided with integral flanges 44 attached by bolts 45 to the bottom face of a metallic bottom wall 46 extending longitudinally of and constituting a base for supporting the arc chamber block assembly. The bottom supporting wall 46 preferably has upstanding end flanges 47 embracing the assembly end walls 40 and to which the assembly is secured in place by the lower tie rod 41 which is extended through said end flanges, as shown. This bottom wall is suitably insulated by a sheet of phenolic material 48. The operator 43 includes an electromagnetic coil element 49 which is suitably connected to any source of electric current. An armature 50 is movable within the electromagnetic element 49 and it has a substantially flat actuator 51 at its upper end which extends through a slot 52 in the bottom wall 56 and into the lower portion of the arc chambers. An elongated bar 53 fashioned from suitable material non-conductive of electricity such as, for example, phenolic, is secured to the upper end of the actuator 51 and said bar extends longitudinally of the related arc chamber block assembly beneath the barriers 13 and transversely to the pairs of terminal contacts contained within the arc chambers of said assembly.

The bar 53 is adapted to carry a plurality of contact elements, to be described presently, so arranged as to be moved by the bar 53 into the make and break contact with related terminal contacts in the arc chambers with which they are associated to thereby close independent circuits in which each pair of terminal contacts are connected. There are multiple contact elements carried on said bar 53. In the disclosure of Fig. 1 these contact elements are substantially alike except that the medial contact element 54, provided to make contact with the high capacity terminal contacts 22, is substantially larger than the contact elements 55 which are provided on each bar to make contact with the low capacity terminal contacts 37. In view of this sole structural difference, the following description of the construction of the contact element 54 also applies to the structure of the contact elements 55.

Accordingly, the contact element 54 (and elements 55) includes an inverted substantially U-shaped mounting bracket 56 which straddles the bar 53 and has slots 57 in its leg portions engaged over the ends of a pin 58 in said bar whereby said bracket 56 may have limited vertical movement independently of said bar. The brackets, however, normally are held in a vertical extended or elevated position above said bar by means of a compression spring 59 interposed between the intermediate portion of said bracket and the top face of the bar. Each bracket carries a contact member 60 which extends transversely of the bar and has a contact 61 firmly secured to the top face of each end thereof, one in axial alignment with each high capacity terminal contact 22.

It should be evident at this time that upon movement of the armature 50 and its actuator 51 upwardly due, for example, to energization of its electromagnetic element 49, the bar 53 is moved upwardly a corresponding distance so as to thereby carry the contacts 61 of contact element 54 into firm electrical engagement with the terminal contacts 22 thus completing an external circuit between said terminal contacts. Similarly, the contacts 61 on the contact elements 55 are carried into make position against the related terminal contacts 37. It should be observed, however, that the contact elements 55 are arranged to move a greater distance than the contact elements 54 so as to thereby cause the high capacity circuits to be closed before closing of the low capacity circuits thus eliminating arcing and other difficulties of heavy current circuits. When the electromagnet is de-energized, the armature and bar drop by their own weight and by the action of the release spring so as to thereby again rapidly open the external circuits. Of course, the action of the electromagnet may be reversed to cause opening of the switch when energized; in which event, spring means would be required to normally hold the circuits closed when the electromagnet is de-energized, unless for example, the switch assembly were installed in a position inverted to that illustrated. The action of the armature, in the instant arrangement, in raising or lowering the contacts 61 is effected with great rapidity, consequently, there is little opportunity for the generation of flash-overs during the make or break action and hence the possibility of burning or welding the complemental contacts is minimized.

The assembly of arc hood blocks may be completely sealed to prevent the entrance of moisture into the arc chambers and possible grounding of any or all of the circuits connected therethrough by arranging a removable front plate 62 across the open front side thereof.

The Fig. 5 disclosure is concerned with a control switch having but a single arc chamber formed of one arc hood block having parts thereof corresponding to parts of the disclosure of Fig. 1 which are identified by like numerals. In such event, an end wall 40 is secured against the opposite faces of a block 12a (like the blocks 11 or 12) so as to completely close the arc chamber therein and the block and end wall assembly is secured as previously described in the description of the Fig. 1 assembly, by suitable tie-rods 41.

Fig. 6 is illustrative of a multiple switch assembly consisting entirely of arc chamber blocks 12, such as are best illustrated in Fig. 3, and like numerals identify corresponding parts. In this assembly, the arc hood blocks are arranged as before in groups having a common switch member of a kind like those previously described except that in this instance, a plurality of contact elements 55 are carried on a single bar 53 and such switch assembly is intended for low capacity circuits.

The Fig. 7 disclosure is concerned with a switch assembly consisting entirely of arc hood blocks 11 which, as previously noted hereinabove, are intended for use in high capacity circuits. In other respects, the assembly is like those previously described herein and like numerals identify corresponding parts.

The switch illustrated in section in Fig. 8 also is substantially like those previously described hereinabove, but in this instance, the downwardly turned front wall 19 of the arc hood block 11 illustrated is recessed, as at 63, upwardly from its bottom edge so as to slidingly receive thereover an upstanding closure wall 64 on a closure element 65 carried on and constituting a part of the switch contact element supporting bar 53a. This particular form of construction provides modified means for closing the otherwise open bottom and front of the arc hood blocks so as to thereby surround and completely seal the arc chamber against the admission of moisture and to avoid grounding.

It should be evident from the foregoing description that a novelly constructed sectional switch has been provided which is capable of universal use and which may be easily and quickly assembled from standard preformed elements to accommodate any desired number of arc hood blocks, and that the structure is such that pole to pole flash-overs are prevented and the possibility of flash-overs between adjacent control switches even though closely spaced is reduced to a minimum.

Although a specific embodiment of the present invention has been illustrated in various combinations so as to provide a single or multiple switch assembly having the same or different circuit capacities, it should be understood that the structure is capable of embodying a variety of modifications without departing from the spirit of the invention or the scope of the appended claim.

I claim:

In a switch including electromagnetically operable means disposed below a lateral support and having a movable armature and an actuator movable by said armature, a block of electrically non-conductive material mounted on said support, said block being formed to provide a vertically disposed rear wall carried on said support, a top wall formed integrally with said rear vertical wall and spaced above said support and having an integral comparatively short depending front wall to provide a hooded arc chamber beneath said top wall, said actuator extending upwardly above said support, end plates of electrically non-conductive material mounted at opposite ends of said block and closing opposite ends of said arc chamber, means for removably securing said end plates to said block, a pair of stationary terminal contacts within said arc chamber, and an electrically connected pair of movable contacts within said arc chamber above said support yieldably carried on an electrically non-conductive bar which is connected with and movable by said actuator whereby said movable contacts are moved into make and break contact with said stationary terminal contacts, said bar having an intgeral extension providing a vertical closure wall disposed below and partially overlapping said depending front wall and being movable relatively to said front wall, said bar and said vertical closure wall cooperating with said front wall to complete the enclosure of said arc chamber.

WILLIAM J. AITKEN.

REFERENCES CITED

The following references are of record in the file of this patent:

UNITED STATES PATENTS

| Number | Name | Date |
|---|---|---|
| 771,344 | White | Oct. 4, 1904 |
| 1,094,693 | Anderson | Apr. 28, 1914 |
| 1,981,534 | Wilms et al. | Nov. 20, 1934 |
| 2,064,632 | Schmitt | Dec. 15, 1936 |
| 2,071,149 | Wilms et al. | Feb. 16, 1937 |
| 2,217,024 | Millermaster et al. | Oct. 8, 1940 |
| 2,239,031 | Bierenfeld et al. | Apr. 22, 1941 |
| 2,323,476 | Lantz | July 6, 1943 |